United States Patent [19]

Tümmler et al.

[11] 3,896,070

[45] July 22, 1975

[54] DISPERSION OF CROSS-LINKABLE ACRYLIC RESIN WITH AMINO-ALDEHYDE

[75] Inventors: Peter Tümmler; Herbert Zima, both of Graz, Austria

[73] Assignee: Vianova-Kunstharz A.G., Vienna, Austria

[22] Filed: July 2, 1974

[21] Appl. No.: 485,273

[30] Foreign Application Priority Data
July 3, 1973 Austria .............................. 5863/73
July 3, 1973 Austria .............................. 5864/73

[52] U.S. Cl. 260/29.4 UA; 117/132 BF; 260/29.1 R; 260/29.6 TA; 260/31.4 R; 260/42.14; 260/80.75; 260/855
[51] Int. Cl. ........................ C08f 15/40; C08g 37/32
[58] Field of Search...260/80.75, 29.4 UA, 29.6 TA, 260/855

[56] References Cited
UNITED STATES PATENTS

| | | | |
|---|---|---|---|
| 3,082,184 | 3/1963 | Falgiatore et al............... | 260/80.75 |
| 3,312,654 | 4/1967 | Pratt et al....................... | 260/80.75 |
| 3,453,346 | 7/1969 | Mabrey et al................... | 260/80.75 |
| 3,475,366 | 10/1969 | Borovicka et al................ | 260/80.75 |
| 3,657,001 | 4/1972 | Parker............................ | 260/80.75 |
| 3,669,942 | 6/1972 | Westrenen et al............... | 260/80.75 |
| 3,787,340 | 1/1974 | Labana et al................... | 260/80.75 |

*Primary Examiner*—Murray Tillman
*Assistant Examiner*—Arthur H. Koeckert
*Attorney, Agent, or Firm*—A. W. Breiner

[57] ABSTRACT

Heat-hardenable coating compositions comprising a mixture of water-soluble or water-dispersible amine resins with aqueous cross-linking dispersions prepared by emulsion polymerization of a monomer blend as follows:
  25–35% by weight of butylmethacrylate
  10–25% by weight of ethylhexylacrylate and/or n-butylacrylate
  10–20% by weight methylmethacrylate
  10–20% by weight styrol
  1–3% by weight methacrylic acid and/or acrylic acid
  10–25% by weight polypropylene glycol monomethacrylate and/or polyethylene glycol monomethacrylate
is described. The heat-hardenable coating compositions when employed as metal finishes have excellent weather resistance, flexibility, scratch resistance, adhesion, and freeness from craters.

8 Claims, No Drawings

DISPERSION OF CROSS-LINKABLE ACRYLIC RESIN WITH AMINO-ALDEHYDE

The present invention is directed to heat-hardenable coating compositions comprising mixtures of water-soluble or water-dispersible amine resins with aqueous polymer dispersions which will undergo cross-linking. The binders can be used to particular advantage in metal finishes.

According to conclusions and opinions set forth in the protective coating art, the advantages of aqueous dispersions, such as low viscosity combined with high solids; high molecular weight; no volatile toxic components, etc., are offset to a substantial degree by serious disadvantages of such systems, including swelling due to the water of the coatings, thereby reducing weather resistance, high porosity, low scratch resistance, and cratering on spray application. To find a solution to these disadvantages, specific polymer systems are described. Various prior art references describe heat-curable coating compositions which contain as the main binder or sole binder aqueous dispersions of co-polymers of acrylic monomers with co-polymerizable compounds. German Offenlegungsschrift No. 1,519,307 teaches aqueous alkaline polymer dispersions containing, in addition, aqueous aminoplasts, a coalescing agent, and a tertiary amine. The polymer dispersions are a blend of two co-polymers, one of them being based on (methylolated) (meth)acrylamide. German Auslegeschrift No. 1,269,337, and German Offenlegungsschrift Nos. 1,794,223 and 1,669,133 describe self-curing co-polymer dispersions based on N-methylolacrylamide or similar substances. German Auslegeschrift No. 1,248,194 describes co-polymer dispersions cross-linking with amine-formaldehyde or phenol-formaldehyde condensation products, the main monomers being α,β-unsaturated carboxylic acid nitriles. In general, the aforesaid dispersions are not suitable for high quality metal finishes, e.g., automobile finishes, since they do not meet the requirements with respect to surface hardness, non-yellowing, high gloss, good gloss retention, and particularly flexibility and adhesion.

German Offenlegungsschrift No. 2,252,065 describes dispersions for metal finishes which contain two nitrogen-free monomer units, one of them being an unsaturated polyester with terminal hydroxy groups. According to this reference, use of such dispersions allows improvements in gloss as well as scratch resistance; however, the flexibility is only sufficient as a maximum, meaning that the practical use of the products is nearly ruled out.

According to the present invention, it has been found that polymer dispersions requiring a selection of specific monomers and specific weight ratios thereof provide coating compositions useful as high-quality stoving paints, which, in mixture with water-soluble or water-dispersible amine resins, yield films with excellent performance in terms of flexibility, scratch resistance, weather resistance, and freeness from craters. The coating compositions of the invention are characterized in that they comprise a blend of -

1. 60 – 95 % by weight of a polymer dispersion prepared by emulsion polymerization, in known manner, of
   25 – 35 % by weight of n-butylmethacrylate
   10 – 25 % by weight of ethylhexylacrylate and/or n-butylacrylate
   10 – 20 % by weight of methylmethacrylate
   10 – 20 % by weight of styrol
   1 – 3 % by weight of methacrylic acid and/or acrylic acid
   10 – 25 % by weight of polypropyleneglycol monomethacrylate and/or polyethyleneglycol monomethacrylate
2. 5 – 40 % by weight of a water-soluble and/or water-dispersible amine-formaldehyde-condensation product, i.e., a cross-linking component, the methylol groups of which are partially or completely etherified with monoalcohols,
3. 0 – 150 % by weight, preferably 0 – 80 % by weight of the total solids of (1) and (2) of a pigment paste consisting of
   a. 4 – 70 % by weight of a pigment and/or filler, and
   b. 30 – 96 % by weight of a pigment wetting agent
4. normal paint additives and/or curing catalysts and/or neutralizing agents. Paints based on the aforesaid coating compositions yield stoving finishes with outstanding resistance to corrosion, and chemical and mechanical influences.

Deviations from the nature of the mentioned co-monomers in the aqueous dispersion, as well as from the quantities thereof, have an adverse influence on the paint performance as well as on the stability of the dispersion. For instance, without a minimum amount of styrol the dispersion cannot be produced free from coagulates and it does not have sufficient stability. The other monomers cannot be substituted for other monomers, or omitted, without detrimental effects on the properties of the co-polymer. The use of polypropylene glycol monomethacrylate or polyethyleneglycol monomethacrylate is of special importance. Other hydroxyesters impart cracking to the drying film, reduce flow and flexibility; whereas the films produced from dispersions of the invention show excellent flexibility, smoothness, flow, and adhesion. The given weight ratios, in extreme cases, can be varied upward or downward by a maximum of 5 percent. The specific dispersions are co-polymerized using emulsion polymerization techniques in known manner in the presence of anionic emulsifiers, optionally also non-ionic emulsifiers, and free radical initiators. Suitable anionic emulsifiers for use in preparing the co-polymers are hydrocarbon sulfonates, such as dodecylbenzolsulfonate, sodium laurylsulfate, sodium tridecylsulfate, or the sulfates or ethoxylated fatty alcohols, like sodium lauryl ethoxylate sulfate, or an octylphenol reacted with 2 mols ethylene oxide and sulfated. It is advantageous to co-employ non-ionic emulsifiers of the type of ethoxylated alkyl phenols together with the anionic emulsifiers.

Suitable amine-formaldehyde condensates are water-soluble, or at least water-dispersible amine-formaldehyde condensates normally used in the paint industry, based on the aminotriazines, such as melamine, the benzoguanamine, etc., as well as urea, or similar substances. The substantially or completely etherified types, either as monomers or oligomers, are preferred, e.g., hexamethoxymethylmelamine.

Suitable pigments or fillers are those normally used by the paint industry. The quantities required for the various end uses and colors are known to those skilled in the art. Suitable pigment wetting agents can be chosen from a variety of groups including -

1. water-dilutable solution polymers of the acrylic type, either available on the market or produced in known manner. Those polymers are preferred which are formed from monomers similar to those of the binder dispersion, the proportion of (meth)acrylic acid being increased to provide sufficient solubility in water.

2. Acrylic resin dispersions produced according to the process of the invention, with 10 percent or more (meth)acrylic acid, and a reduced content of polypropylene or polyethyleneglycolmonomethacrylate.

3. Solutions of anionic and/or non-ionic emulsifiers in high-boiling water-tolerant solvents, e.g., 2-dimethyl-4-oxymethyl-1,3-dioxolane, ethyleneglycolmonobutyletheracetate, ethylene glycolmonoethyl ether acetate, ethylene glycolmonoethyl ether. The pigments, together with the pigment wetting agent, are dispersed with normal grinding equipment and are blended with the dispersion. (1) and (2) above are ideally suited for preparing stable pigment pastes with inorganic pigments.

The following preparations and examples illustrate the invention without limiting the scope thereof. Parts are by weight.

EXAMPLE 1

In a polymerization reaction vessel -
a. 2.9 parts dodecylbenzolsulfonate
9.8 parts ethoxylated octylphenol (with 16 mols ethylene oxide)
2 parts ammonium persulfate
are dissolved in 1090 parts deionized water. The solution is heated to 75°C., and the following blend (b) is continuously added over a period of 90 minutes:
b. 265 parts butylmethacrylate
140 parts ethylhexylacrylate
141 parts methylmethacrylate
141 parts styrol
190 parts propyleneglycolmonomethacrylate
15 parts methacrylic acid
4.4 parts dodecylmercaptan During the addition the temperature is slowly raised to 85°C. After the addition, 28 parts of a $C_{12} - C_{14}$ fatty alcohol reacted with 25 mols ethylene oxide and 3 parts of an octylphenol which was reacted with 3 mols ethylene oxide and subsequently sulfated, dissolved in 100 parts water, are added. To complete conversion, the temperature is raised to 95°C., and held for 10 minutes. After cooling, a highly stable dispersion with about 44 percent solids is obtained.

For further processing the pH-value of the dispersion is adjusted to 7.5 with an alkanol amine, e.g., dimethylethanolamine.

EXAMPLE 2

Analogous to Example 1, a polymer dispersion is produced using the following blend (b):
b. 265 parts butylmethacrylate
126 parts n-butylacrylate
155 parts methylmethacrylate
141 parts styrol
190 parts polypropyleneglycolmonomethacrylate
15 parts methacrylic acid
4.4 parts tert.dodecylmercaptan

EXAMPLE 3

Analogous to Example 1, a polymer dispersion is prepared using the following blends (a) and (b):
a. 3 parts sodiumlaurylethoxylatesulfate
9.8 parts ethoxylated octylphenol (with 16 mols ethylene oxide)
2 parts ammoniumpersulfate
1090 parts deionized water
b. 225 parts butylmethacrylate
225 parts ethylhexylacrylate
162 parts methylmethacrylate
180 parts styrol
90 parts polypropyleneglycol monomethacrylate
18 parts acrylic acid
4.4 parts tert.dodecylmercaptan

EXAMPLE 4

Analogous to Example 1, the following blends (a) and (b) are polymerized:
a. 3.0 parts of an octylphenol reacted with 2 mols ethylene oxide and subsequently sulfated
9.8 parts of an ethoxylated octylphenol (with 16 mols ethylene oxide)
2 parts ammoniumpersulfate
1090 parts deionized water
b. 320 parts butylmethacrylate
90 parts ethylhexylacrylate
90 parts methylmethacrylate
180 parts styrol
180 parts polypropyleneglycolmonomethacrylate
30 parts methacrylic acid
4.4 parts tert.dodecylmercaptan The polypropylene glycolmonomethacrylate can be replaced by the same quantity of polyethylene glycol monomethacrylate. The obtained results are comparable.

The preparation of pigment pastes for use in paint compositions demonstrating this invention is shown in Table I hereinafter.

TABLE I

| Preparation of Pigment Paste Number | Pigment of Wetting Agent | Pigment | Mill Type |
|---|---|---|---|
| I | 148.5 parts acrylic resin/65%[1(a)]<br>237.5 parts butylglycolacetate[2]<br>11.0 parts dimethylethanolamine[3] | 386 parts TiO$_2$-rutile | ball mill with steatite balls (15 hours) |
| II | 161 parts acrylic resin/60%[1(b)]<br>225 parts ethylglycol[2(a)]<br>10 parts dimethylethanolamine[3] | 386 parts molybdatered | As in I (10 hours) |
| III | As in I | 58 parts pigment blue[4]<br>15 No. 74160 | As in I (60 hours) |
| IV | As in I | 58 parts carbon black | As in I (80 hours) |
| V | 350 parts acrylic dispersion[5]<br>28 % in water | 392 parts molybdatered | As in I (10 hours) |
| VI | 74.4 parts 2-dimethyl-4-oximethyl-1,3-dioxalane<br>12.8 parts dodecylbenzylsulfonate<br>12.8 parts ethoxylated cetyl alcohol (25 ethylene oxide) | 200 parts molybdatered | three roll |

TABLE I—Continued

| Preparation of Pigment Paste Number | Pigment of Wetting Agent | Pigment | Mill Type |
|---|---|---|---|
| VII | As in VI | 200 parts TiO$_2$-rutile | As in VI |
| VIII | As in VI | 50 parts pigment blue 15 No. 74160 | As in VI |
| IX | 170 parts acrylic resin[1(c)] 56.7% in butylglycolacetate<br>216 parts butylglycolacetate<br>11 parts dimethylethanolamine | 386 parts TiO$_2$-rutile | As in I (15 hours) |

[1]Acrylic resin
[1(a)]is a self-reacting water-soluble acrylic polymer prepared according to Austrian Patent Specification No. 291,571; acrylic resin
[1(b)]is a self-reacting water-soluble acrylic polymer on the basis of methylolated acrylamide; acrylic resin
[1(c)]is a water-soluble acrylic polymer on the basis of the monomers blend of Example 1, with 9 % methacrylic acid and 12 percent polypropylene glycolmonomethacrylate.
[2]monoethyleneglycolmonobutylether acetate
[2(a)]monoethyleneglycol monoethyl ether
[3]salt formation for obtaining solubility in water
[4]according to Color Index
[5]dispersion according to Example 1 with 9 percent methacrylic acid and 12 percent polypropylene glycolmonomethacrylate
For tinting the paints pigmented with organic pigments, available pigment preparations in form of pastes for aqueous media (e.g., "Colanyl" or "Teig-P-Pigmente) can also be used.

Paint preparations based on this invention, and the pigment pastes of Table I are set forth in Table II hereinafter.

mine, the amine resin solution, a curing catalyst and water such that an end viscosity of about 25 s DIN 53 211 is obtained.

TABLE II

| Preparations | 1 | 2 | 3 | 4 | 5 | 6 | 7 | 8 | 9 | 10 | 11 | 12 |
|---|---|---|---|---|---|---|---|---|---|---|---|---|
| Pigment Paste I | 33.2 | — | 33.2 | — | — | — | — | 33.2 | 33.2 | 33.2 | 33.2 | — |
| Pigment Paste II | — | 33.2 | — | — | — | — | — | — | — | — | — | — |
| Pigment Paste III | — | — | 10 | — | — | — | — | — | — | — | — | — |
| Pigment Paste IV | — | — | — | — | — | — | — | — | — | 5 | — | — |
| Pigment Paste V | — | — | — | 30.3 | — | — | — | — | — | — | — | — |
| Pigment Paste VI | — | — | — | — | 24 | — | — | — | — | — | — | — |
| Pigment Paste VII | — | — | — | — | — | 24 | 24 | — | — | — | — | — |
| Pigment Paste VIII | — | — | — | — | — | — | 3.9 | — | — | — | — | — |
| Pigment Paste IX | — | — | — | — | — | — | — | — | — | — | — | 33.2 |
| Acrylic dispersion, 43.2% of Example 1 | 65 | 65 | 60 | 65 | 74 | 74 | 74 | — | — | — | 62 | — |
| Acrylic dispersion, 44% of Example 2 | — | — | — | — | — | — | — | 65 | — | — | — | — |
| Acrylic dispersion, 41.5% of Example 3 | — | — | — | — | — | — | — | — | 69 | — | — | — |
| Acrylic dispersion, 45% of Example 4 | — | — | — | — | — | — | — | — | — | 64 | — | 64 |
| hexamethoxymethyl-[1] melamine, 100% | 8 | 8 | 8 | 8 | 8 | 8 | 8 | 8 | 8 | 8 | 8 | 8 |
| water | 11 | 13 | 12 | 12 | 14 | 12 | 11 | 12 | 12 | 13 | 14 | 8 |
| p-toluol sulfonic acid 10%, in water | 1.6 | 1.6 | 1.6 | 1.6 | 1.6 | 1.6 | 1.6 | 1.6 | 1.6 | 1.6 | 1.6 | 1.6 |

[1]Hexamethoxymethylmelamine can optionally be dissolved in suitable solvents in order to render more handleable the crystalline types.
Amounts are parts by weight.
%,where indicated, is % solids, or non-volatile.

In preparations 1 – 12 of Table II, the paints are prepared as follows:

With constant stirring the pigment paste is blended with the aqueous acrylic dispersions of the invention; neutralized to a pH-value of 7.5 with dimethylethanola- The various paints prepared according to Table II were evaluated, the results tabulated in Tables III and IV hereinafter. Table IV is data on corrosion tests. Unless otherwise stated, the paints are sprayed onto clean untreated steelpanels (0.8 mm) and stoved for 30 minutes at 160°C.

TABLE III[1]

| | 1 | 2 | 3 | 4 | 5 | 6 | 7 | 8 | 9 | 10 | 11 | 12 |
|---|---|---|---|---|---|---|---|---|---|---|---|---|
| film thickness/μm | 40 | 38 | 40 | 36 | 40 | 41 | 39 | 38 | 40 | 45 | 40 | 42 |
| Erichsen indentation | 7.4 | 7.2 | 7.5 | 7.9 | 8.1 | 7.8 | 7.9 | 8.1 | 7.6 | 7.8 | 7.4 | 7.6 |
| crosshatch DIN 53 151 | 1–2 | 1–2 | 1–2 | 1 | 1–2 | 1–2 | 1–2 | 1 | 2–3 | 2 | 1–2 | 2 |
| impact[2] | 70 | 65 | 70 | 75 | 75 | 75 | 75 | 80 | 80 | 75 | 70 | 70 |
| gloss (Gonio-[3] photometer GP 2/45°) | 79 | 80 | 81 | 77 | 85 | 81 | 79 | 81 | 89 | 85 | 79 | 81 |
| pendulum hardness DIN 53 157, Konig | 151 | 156 | 150 | 162 | 156 | 145 | 165 | 139 | 102 | 142 | 151 | 145 |
| mandrel ASTM D 522 - 41 | 32 | 32 | 32 | 32 | 32 | 32 | 32 | 32 | 32 | 32 | 32 | 32 |
| xylol test[4] | | | | | | | | | | | | |

TABLE III[1] —Continued

| | 1 | 2 | 3 | 4 | 5 | 6 | 7 | 8 | 9 | 10 | 11 | 12 |
|---|---|---|---|---|---|---|---|---|---|---|---|---|
| (xylol soaked cotton pad) after 4 minutes | U-1 | U-1 | U-1 | U-1 | U-1 | U-1 | U-1 | U-1 | U-1 | U-1 | U-1 | U-1 |

[1] The evaluated paint films were sprayed onto untreated steel panels of 0.8 mm thickness and cured at 160°C. for 30 minutes.
[2] Gardner impact, inch × pounds.
[3] Gloss with goniophotometer GP at 45°— —gloss = $\frac{\text{sample / reading}}{\text{standard / 100 parts}}$
[4] Xylol test:
- U: no attack after indicated time, film not swollen, cannot be scratched off with fingernail.
- 1: slightly swollen after indicated time, can be scratched off with some effort.
- 2: slightly swollen after indicated time, can be scratched off easily.
- 3: strongly swollen after indicated time, film crinkles and starts to peel off.
- 4: film almost dissolved, tacky, can be wiped off.

TABLE IV[5]

| | 1 | 2 | 3 | 4 | 5 | 6 | 7 | 8 | 9 | 10 | 11 | 12 |
|---|---|---|---|---|---|---|---|---|---|---|---|---|
| tropical test 500 hours | m1g1 | m1g1 | m1g1 | m1g1 | m1g1 | m1g1 | m1g1 | m1g1 | m3g2 | m2g1 | m1g1 | m2g1 |
| Kesternich corrosion test[5] (0.2 1 SO$_2$) (20 rounds) | ← no attack → | | | | | | m3g1 | ← no attack → | | | | |
| salt spray resistance ASTM B 117-64 550 hours | m2g1 | m2g1 | m2g1 | m2g1 | m2g1 | m2g1 | m2g1 | m3g2 | m3g2 | m2g2 | m2g1 | m2g1 |
| water soak at 40°C. 350 hours | ← m1 g1 → | | | | | | | | m4g2 | m2g2 | m1g1 | m2g1 |

[5] Corrosion tests were run on Zink Bonder No. 125 panels, with an anti-corrosion primer applied by electrodeposition and wet-sanded with emery wet paper No. 600.

It is claimed:

1. Heat hardenable coating compositions comprising 1. 60 – 95 % by weight of a polymer dispersion prepared by emulsion polymerization of -
    25 – 35 % by weight of butylmethacrylate
    10 – 25 % by weight of ethylhexylacrylate and/or n-butylacrylate
    10 – 20 % by weight of methylmethacrylate
    10 – 20 % by weight of styrol
    1 – 3 % by weight of methacrylic acid and/or acrylic acid
    10 – 25 % by weight of polypropyleneglycol monomethacrylate and/or polyethyleneglycol monomethacrylate,
2. 5 – 40 % by weight of a water-soluble or water-dispersible amine-formaldehyde-condensation product, the methylol groups of which are partially or completely etherified with monoalcohols, and
3. 0 – 150 % by weight of the total solids of (1) and (2) of a pigment paste of -
    a. 4 – 70 % by weight of a pigment and/or filler, and
    b. 30 – 96 % by weight of a pigment wetting agent.

2. Heat hardenable coating compositions according to claim 1 wherein the pigment wetting agent is a water-soluble solution polymer of the acrylic type.

3. Heat hardenable coating compositions according to claim 1 wherein the pigment wetting agent is an aqueous dispersion of acrylic monomers.

4. Heat hardenable coating compositions according to claim 1 wherein the pigment wetting agent is a solution of an anionic emulsifier in high-boiling water-tolerant solvents.

5. Heat hardenable coating compositions according to claim 1 wherein the pigment wetting agent is a solution of a non-ionic emulsifier in high-boiling water-tolerant solvents.

6. Heat hardenable coating compositions according to claim 1 wherein the pigment wetting agent is a solution of an admixture of anionic and non-ionic emulsifiers in high-boiling water-tolerant solvents.

7. Heat hardenable coating compositions according to claim 1 wherein the polymer dispersion is prepared in the presence of anionic emulsifiers.

8. Heat hardenable coating compositions according to claim 1 wherein the polymer dispersion is prepared in the presence of anionic and non-ionic emulsifiers.

* * * * *